United States Patent
Ushiroda et al.

(10) Patent No.: US 8,285,450 B2
(45) Date of Patent: Oct. 9, 2012

(54) DIFFERENTIAL LIMITING CONTROL DEVICE FOR VEHICLE

(75) Inventors: Yuichi Ushiroda, Tokyo (JP); Kaoru Sawase, Tokyo (JP); Yusuke Fujii, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 1236 days.

(21) Appl. No.: 11/704,965

(22) Filed: Feb. 12, 2007

(65) Prior Publication Data

US 2007/0213913 A1    Sep. 13, 2007

(30) Foreign Application Priority Data

Mar. 7, 2006   (JP) ................. 2006-060855

(51) Int. Cl.
G06F 7/00     (2006.01)
G06F 17/00    (2006.01)

(52) U.S. Cl. ............... 701/41; 701/53; 701/58

(58) Field of Classification Search ........ 701/1, 36, 701/41, 45, 48, 53, 58, 67–69, 71–73, 74, 701/82, 88–89; 180/170, 172, 197; 340/438–441
See application file for complete search history.

(56) References Cited

U.S. PATENT DOCUMENTS

| | | | |
|---|---|---|---|
| 6,810,983 B2 * | 11/2004 | Matsuno | 180/249 |
| 2005/0121248 A1 | 6/2005 | Ushiroda et al. | |

FOREIGN PATENT DOCUMENTS

| | | |
|---|---|---|
| DE | 42 01 146 A1 | 7/1992 |
| DE | 44 00 685 A1 | 7/1994 |
| DE | 698 29 449 T2 | 9/2005 |
| JP | 6-211063 A | 8/1994 |
| JP | 2527204 B2 | 6/1996 |
| JP | 10-29557 A | 2/1998 |
| JP | 2005-162097 A | 6/2005 |

* cited by examiner

*Primary Examiner* — Thomas Tarcza
*Assistant Examiner* — Edward Pipala
(74) *Attorney, Agent, or Firm* — Birch, Stewart, Kolasch & Birch, LLP

(57) ABSTRACT

A differential limiting control device for a vehicle calculates a yaw rate correspondence control amount according to deviation between actual yaw rate and target yaw rate when a vehicle turns, and also judges the vehicle's steering characteristic of the moment and magnitude relation between wheel speeds of right and left front wheels. The differential limiting control device then applies compensation toward an increase or decrease side based on a yaw rate correspondence control amount to a base control amount according to a combination of the steering characteristic and the magnitude relation between the wheel speeds, and controls a differential limiting force between the right and left front wheels based upon a final control amount obtained after the compensation.

4 Claims, 4 Drawing Sheets

DIFFERENTIAL LIMITING CONTROL DEVICE FOR VEHICLE

BACKGROUND OF THE INVENTION

1. Field of the Invention

The present invention relates to a differential limiting control device for controlling a differential limiting force between right and left wheels of a vehicle.

2. Description of the Related Art

Such a vehicle that is provided with a differential limiting device of an electronic control type using a control device, such as a clutch, a pump and a motor, in between right and left front or rear wheels to which the driving force of an engine is transmitted has been in practical use. In a vehicle of this kind, the differential limiting device is used to apply a differential limiting force to between the right and left wheels and to shift torque from a wheel having higher wheel speed to another wheel having lower wheel speed. Accordingly, the driving characteristic of the vehicle is properly controlled. A device that carries out the control described above is disclosed, for example, in Japanese Patent No. 2527204 (hereinafter, referred to as Document 1).

The control device disclosed in Document 1 is applied to a four-wheel drive vehicle whose base is an FR layout vehicle (Front-engine Rear-drive layout vehicle) for the purpose of preventing understeer and oversteer in a turning situation. A transfer for transferring a portion of the driving force of the rear wheels to the front wheels are arranged in between the front and rear wheels of this vehicle. Between the right and left rear wheels, there is disposed the differential limiting device that produces a differential limiting force. The control device lessens the differential limiting force of a differential limiting device and also reduces the amount of the driving force transferred to the front wheels by the transfer when it is suspected that the wheel speeds of outer wheels during turning are higher than those of inner wheels, and that the inner wheels have a grip on a road. By so doing, the device intends to prevent understeer.

The control device disclosed in Document 1 controls the differential limiting force in view of the wheel speeds of the right and left wheels. The wheel speeds of the right and left wheels, however, are no more than one of indicators indicative of the driving state of the vehicle, and they are not sufficient for proper control of the differential limiting force. For instance, even in a situation where the wheel speeds of the right and left wheels are under the same conditions, an optimum differential limiting force varies, depending on whether the vehicle's steering characteristic is understeer or oversteer. This causes the problem that the differential limiting force is improperly controlled in some driving states, and a good steering characteristic cannot be actualized.

SUMMARY OF THE INVENTION

An aspect of the present invention is directed to a differential limiting control device for a vehicle, comprising differential limiting means capable of regulating a differential limiting force between right and left wheels to which a driving force from a driving source is transmitted; target turning state index determination means for determining a target turning state index on the basis of a driving state of a vehicle; actual turning state index detection means for detecting an actual turning state index of the vehicle; control amount calculating means for calculating a turning correspondence control amount as a compensation amount with respect to the differential limiting force to be applied to between the right and left wheels, based upon the target turning state index and the actual turning state index; steering characteristic judging means for judging a vehicle's steering characteristic of the moment based upon the target turning state index and the actual turning state index; wheel speed detection means for detecting wheel speeds of the right and left wheels; and differential limiting control means for reflecting the turning correspondence control amount in the differential limiting force for compensation toward an increase or decrease side according to a combination of the steering characteristic judged by the steering characteristic judging means and magnitude relation between the wheel speeds of the right and left wheels detected by the wheel speed detection means, and controlling the differential limiting means according to a differential limiting force after the compensation.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

A differential limiting control device for a vehicle according to one embodiment of the present invention will be described below with reference to the attached drawings.

Figure 1:
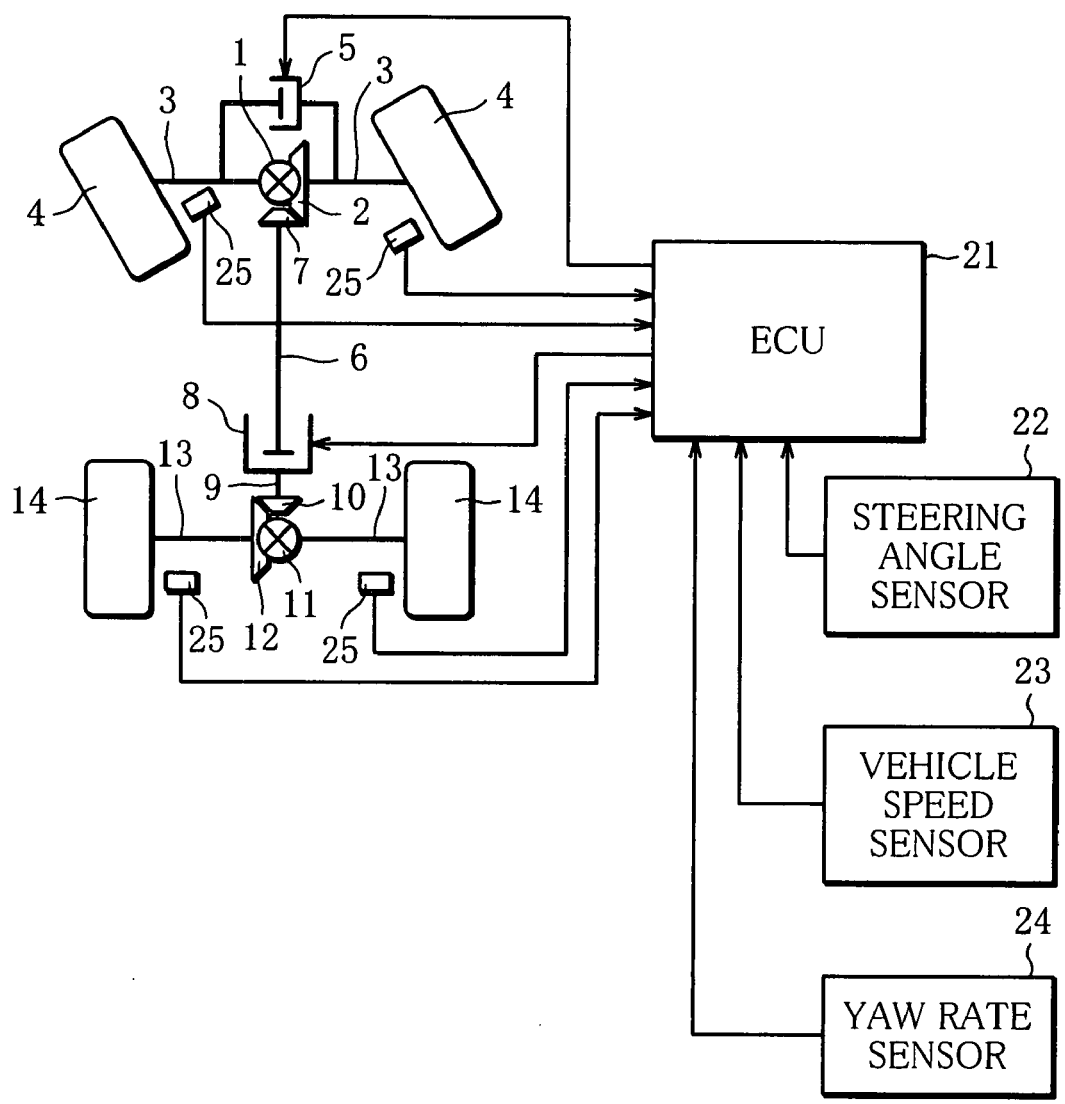
FIG. 1 is a view showing an entire configuration of a differential limiting control device for a vehicle according to one embodiment of the present invention.

FIG. 1 is a view showing an entire configuration of the differential limiting control device for a vehicle according to the present embodiment. The vehicle has an electronic control on-demand type four-wheel drive mechanism based on an FF layout vehicle.

A front differential 1 is located in the front of the vehicle. A ring gear 2 fixed to the front differential 1 is inputted with a driving force of an engine (driving source), not shown, through a transmission. The front differential 1 is connected with right and left front wheels 4 through drive shafts 3. The front differential 1 transmits the driving force of the engine which is inputted to the ring gear 2 to the right and left front wheels 4 while allowing differential. At the side of the front differential 1, an electronic control type front LSD (Limited Slip Differential) 5 (differential limiting means) is disposed. The electronic control type front LSD 5 applies the differential limiting force to between the right and left front wheels 4 according to an engagement state of a built-in electromagnetic clutch, not shown.

Operation principles of the electronic control type front LSD 5 are not limited to the foregoing. The electronic control type front LSD 5 may be modified at will as long as it is capable of generating a differential limiting force by means of a control device, such as a pump or a motor. For instance, the engagement state of the clutch may be adjusted by operating a hydraulic piston using operating oil that is supplied from a hydraulic pump.

The ring gear 2 of the front differential 1 is engaged with a gear 7 fixed to a front end of a front propeller shaft 6. A rear end of the front propeller shaft 6 is connected to a front end of a rear propeller shaft 9 through an electronic control coupling 8. A gear 10 fixed to a rear end of the rear propeller shaft 9 is engaged with a ring gear 12 of a rear differential 11. Connected to the rear differential 11 are right and left rear wheels 14 through drive shafts 13.

A portion of the driving force of the engine is transferred from the front differential 1 to the side of the rear differential 11 through the propeller shafts 6 and 9 and the electronic control coupling 8. The driving force transferred to the rear differential 11 is transmitted to the right and left rear wheels 14 through the rear differential 11 while the rear differential 11 allows differential of the right and left rear wheels 14. The electronic control coupling 8 regulates the driving force transferred to the side of the rear wheels 14 according to the engagement state of the built-in electromagnetic clutch, not shown, and simultaneously applies the differential limiting force to between the front and rear wheels 4 and 14.

A 4WD ECU (Electronic Control Unit) 21 is installed in a vehicle compartment. The 4WD ECU 21 has an input/output device, storage devices (ROM, RAM, etc.) provided for storing control programs, control maps and the like, a central processing unit (CPU), timers, etc, which are not shown in the figure.

Connected to an input side of the 4WD ECU 21 are various kinds of sensors including a steering angle sensor 22 for detecting steering angle $\theta_{str}$ of a steering mechanism, a vehicle speed sensor 23 for detecting vehicle speed V, a yaw rate sensor 24 for detecting yaw rate Y of the vehicle, a wheel speed sensor 25 for detecting wheel speeds $N_{FR}$, $N_{FL}$, $N_{RR}$, and $N_{RL}$ of the vehicle wheels 4 and 14, etc. Connected to an output side of the 4WD ECU 21 are various kinds of devices including an electromagnetic clutch of the electronic control type front LSD 5, an electromagnetic clutch of the electronic control coupling 8, etc.

Based upon detected information from the above-mentioned sensors, the 4WD ECU 21 controls an engagement state of the electromagnetic clutches of the electronic control type front LSD 5 and the electronic control coupling 8.

The engagement state of the electromagnetic clutch of the electronic control coupling 8 is controlled by a general method in which the engagement state is controlled according to a control amount that reflects revolving speed difference between the front and rear wheels 4 and 14 (difference between an average value of the front wheel speeds $N_{FR}$ and $N_{FL}$ and that of the rear wheel speeds $N_{RR}$ and $N_{RL}$).

As to the electronic control type front LSD 5, a unique method is employed, which controls the engagement state of the electromagnetic clutch according to a control amount that reflects a steering characteristic of the vehicle in addition to revolving speed difference between the right and left front wheels. Hereinafter, a procedure of setting the control amount in respect of the differential limiting force of the electronic control type front LSD 5 will be described.

Figure 2:
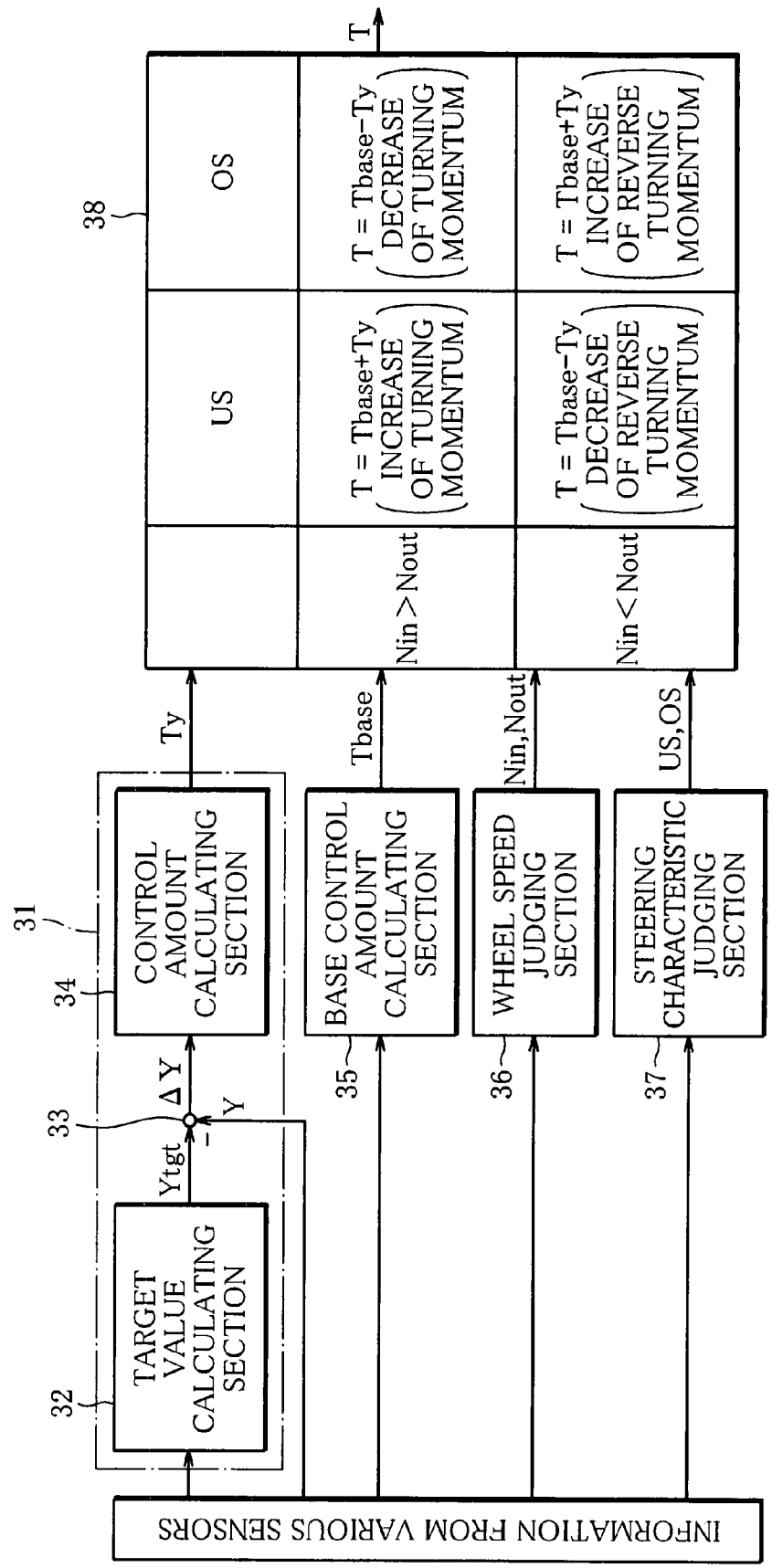
FIG. 2 is a control block diagram showing a procedure of setting a control amount of an electronic control type front LSD, which is carried out by an ECU.

FIG. 2 is a control block diagram showing the procedure of setting the control amount of the electronic control type front LSD 5, which is implemented by the ECU 21.

A yaw rate correspondence control amount calculating section 31 has a function of setting a yaw rate correspondence control amount $T_y$ as a differential limiting force corresponding to yaw rate that generates when the vehicle turns. The yaw rate correspondence control amount calculating section 31 is formed of a target value calculating section 32, a deviation calculating section 33 and a control amount calculating section 34.

The target value calculating section 32 is inputted with the steering angle $\theta_{str}$ from the steering angle sensor 22 and the vehicle speed V from the vehicle speed sensor 23. Based upon the steering angle $\theta_{str}$ and the vehicle speed V, the target value calculating section 32 calculates target yaw rate $Y_{tgt}$ as an optimum value of the yaw rate that generates in the vehicle during turning. The target yaw rate $Y_{tgt}$ thus calculated is inputted to the deviation calculating section 33 with actual yaw rate Y that is detected by the yaw rate sensor 24. The deviation calculating section 33 calculates yaw rate deviation $\Delta Y$ by subtracting the actual yaw rate Y from the target yaw rate $Y_{tgt}$. The yaw rate deviation $\Delta Y$ is inputted to the control amount calculating section 34. Based upon the yaw rate deviation $\Delta Y$, the control amount calculating section 34 calculates the yaw rate correspondence control amount $T_y$ (turning correspondence control amount). An optimum yaw rate correspondence control amount $T_y$ for preventing understeer and oversteer correspondingly to the yaw rate deviation $\Delta Y$ is previously set in the control map. The control amount calculating section 34 finds the yaw rate correspondence control amount $T_y$ corresponding to the yaw rate deviation $\Delta Y$ from the control map.

A base control amount calculating section 35 calculates a base control amount $T_{base}$ other than the yaw rate correspondence control amount $T_y$. For instance, the base control amount $T_{base}$ is calculated in the following manner. When the vehicle turns, a revolution difference correspondence control amount is calculated on the basis of difference between the wheel speeds $N_{FR}$ and $N_{FL}$ of the right and left front wheels 4. When the vehicle is accelerated by operating an accelerator pedal, an acceleration correspondence control amount for preventing an initial slip is calculated according to an accelerator pedal operation amount and the like. Moreover, when the vehicle is decelerated by operating a brake pedal, a deceleration correspondence control amount for stabilizing a vehicle position is calculated according to vehicle deceleration and the like. Total of these control amounts is set as the base control amount $T_{base}$.

A wheel speed judging section 36 differentiates the inner wheel and the outer wheel of the right and left front wheels 4, for example, on the basis of a vehicle turning direction that is estimated from the steering angle $\theta_{str}$. Based upon a result of the differentiation, the wheel speed judging section 36 determines magnitude relation between the wheel speed of the inner wheel in a turning situation (hereinafter, referred to as inner wheel speed $N_{in}$) and the wheel speed of the outer wheel in a turning situation (hereinafter, referred to as outer wheel speed $N_{out}$).

A steering characteristic judging section 37 judges a vehicle's steering characteristic of the moment, that is, determines whether the vehicle understeers or oversteers, based upon a comparison result between the target yaw rate $Y_{tgt}$ and the actual yaw rate Y.

The yaw rate correspondence control amount $T_y$ from the yaw rate correspondence control amount calculating section 31, the base control amount $T_{base}$ from the base control amount calculating section 35, the magnitude relation between the inner wheel speed $N_{in}$ and the outer wheel speed $N_{out}$ from the wheel speed judging section 36, and the steering characteristic from the steering characteristic judging section 37 are inputted to a final control amount calculating section 38. Based upon the above information, the final control amount calculating section 38 calculates a final control amount T according to calculation conditions shown in a table in FIG. 2.

Although not shown in FIG. 2, when the vehicle is not in a turning situation, or even in a turning situation, if the steering characteristic is neutral steer, the yaw rate correspondence control amount $T_y$ is not reflected upon the calculation of the final control amount T. Instead, the base control amount $T_{base}$ is set directly as the final control amount T.

Based upon the final control amount T that is set as described, an actual differential limiting force between the right and left front wheels 4 is controlled. More specifically, duty rate corresponding to the final control amount T is set from a map, not shown. Through excitation of the electromagnetic clutch of the electronic control type front LSD 5 based upon the duty rate, the engagement state of the electromagnetic clutch is adjusted. As a result, the differential limiting force between the right and left front wheels 4 is regulated to a value corresponding to the final control amount T.

A control state in which the 4WD ECU 21 controls the differential limiting force between the right and left front wheels 4 based upon the final control amount T that is set as described above will be explained below with reference to an example in which the vehicle takes a left turn.

Figure 3:
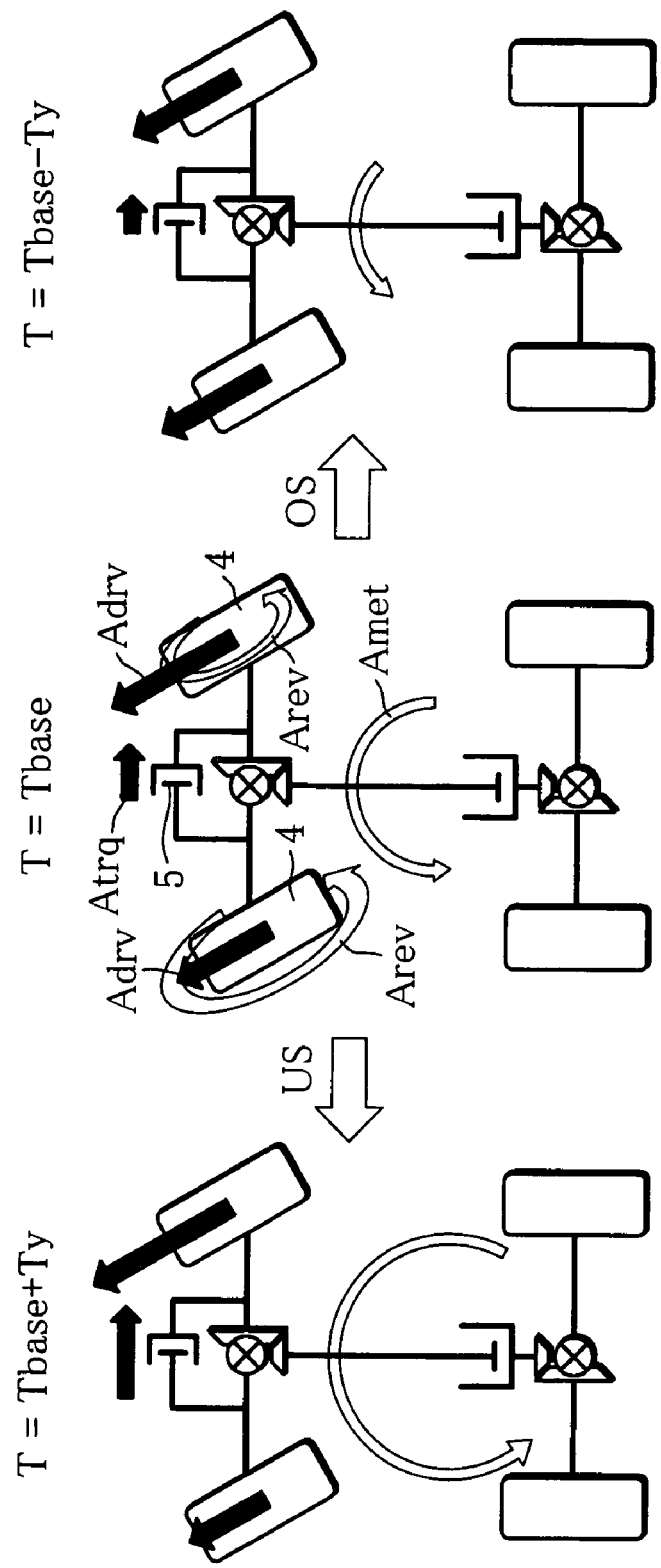
FIG. 3 is a pattern diagram showing a control state of a differential limiting force when inner wheel speed is higher than outer wheel speed.
Figure 4:
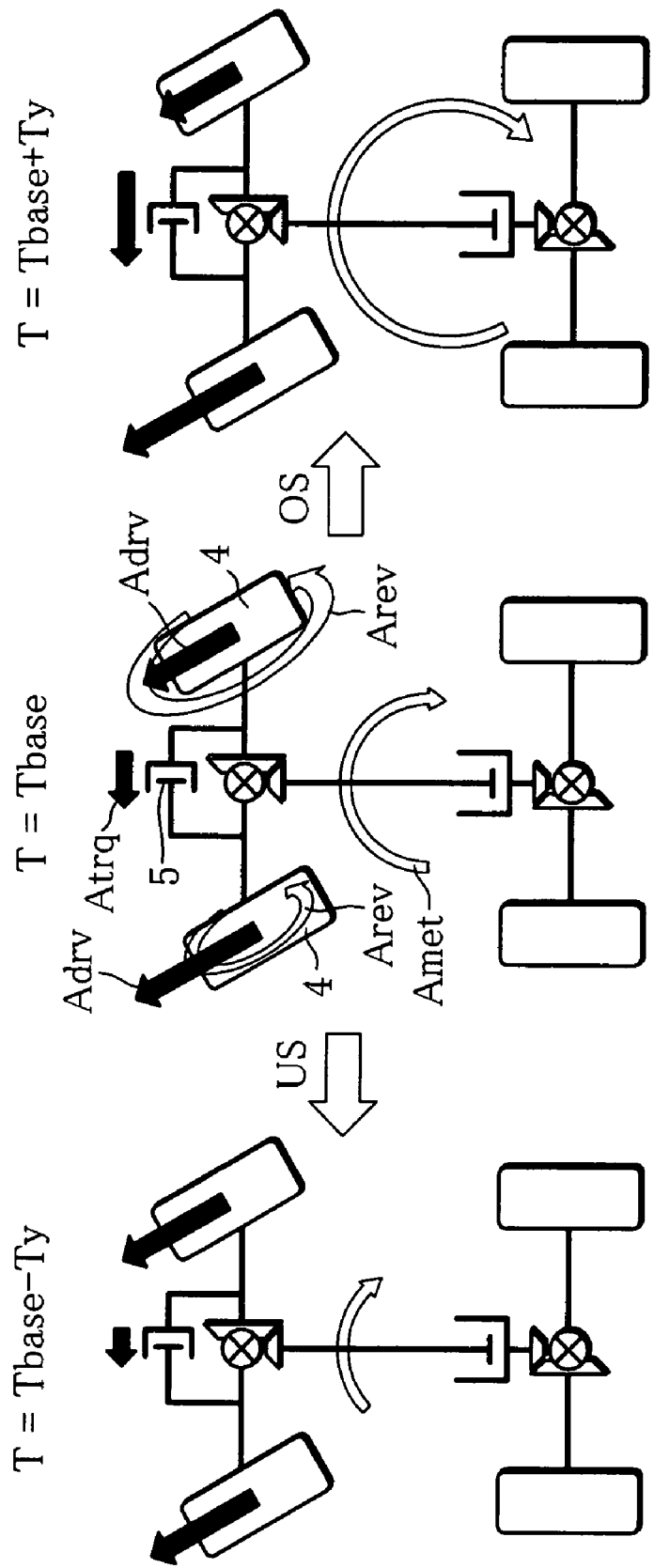
FIG. 4 is a pattern diagram showing a control state of the differential limiting force when the inner wheel speed is lower than the outer wheel speed.

FIG. 3 is a pattern diagram showing the control state of the differential limiting force when the inner wheel speed $N_{in}$ is higher than the outer wheel speed $N_{out}$. FIG. 4 is a pattern diagram showing the control state of the differential limiting force when the inner wheel speed $N_{in}$ is lower than the outer wheel speed $N_{out}$. Each of the figures shows in the center the control state of the differential limiting force when the vehicle's steering characteristic is neutral steer. In both the figures, the control state of the differential limiting force when the steering characteristic is understeer (indicated by "US" in the figures) is shown on the left side, and the control state of the differential limiting force when the steering characteristic is oversteer (indicated by "OS") on the right side. Lengths of curved white arrows $A_{rev}$ attached to the right and left front wheels 4 indicate the inner wheel speed $N_{in}$ and the outer wheel speed $N_{out}$. Lengths of straight black arrows $A_{drv}$ attached to the right and left front wheels 4 indicate driving forces. The length and direction of a straight black arrow $A_{trq}$ between the right and left front wheels 4 indicate a torque shift amount and a torque shift direction which are generated by the differential limiting force corresponding to the final control amount T. The size and direction of a curved white arrow $A_{met}$ located in the center of the vehicle indicate the size and direction of momentum that encourages or suppresses the turning of the vehicle.

First, the control state of the differential limiting force when the inner wheel speed $N_{in}$ is higher than the outer wheel speed $N_{out}$ will be described below with reference to FIG. 3. Because the torque shift caused by differential limiting between the right and left front wheels 4 takes place from the high side to the low side of the wheel speed, the torque shifts from the inner wheel to the outer wheel when the inner wheel speed $N_{in}$ is higher than the outer wheel speed $N_{out}$, and the right and left front wheels 4 creates a driving force corresponding to the torque shift amount. Momentum corresponding to the driving force of the right and left front wheels 4 occurs in the vehicle. In this way, the outer wheel generates a higher driving force than the inner wheel at any rate when the torque shifts from the inner wheel to the outer wheel. Therefore, turning momentum that acts in a direction of encouraging the turning occurs in the vehicle.

If the vehicle's steering characteristic is neutral steer as shown in the center of FIG. 3, the base control amount $T_{base}$ is set directly as the final control amount T. If the steering characteristic shifts to understeer as shown on the left side of FIG. 3 from the foregoing state, the final control amount T is compensated to increase by the yaw rate correspondence control amount $T_y$. For this reason, the actual differential limiting force between the right and left front wheels 4 also increases according to the increase of the final control amount T. Consequently, the torque shift amount from the inner wheel to the outer wheel increases. The driving force of the inner wheel is reduced, whereas that of the outer wheel is increased. This enhances the turning momentum of the vehicle, so that understeer is avoided.

If the vehicle's steering characteristic shifts from neutral steer to oversteer as shown in on the right side of FIG. 3, the final control amount T is compensated to decrease by the yaw rate correspondence control amount $T_y$. Therefore, the actual differential limiting force between the right and left front wheels 4 is also reduced according to the decrease of the final control amount T. As a result, the torque shift amount from the inner wheel to the outer wheel is reduced. The driving force of the inner wheel is increased, whereas that of the outer wheel is decreased. This lessens the turning momentum of the vehicle and prevents oversteer. More specifically, the direction of the torque shift from the inner wheel to the outer wheel cannot be changed because of the magnitude relation between the inner and outer wheel speeds $N_{in}$ and $N_{out}$ in this situation, so that the turning momentum that encourages the turning still occurs in the vehicle. However, the turning momentum is reduced to the greatest extent possible by controlling the differential limiting force, to thereby prevent oversteer.

The control state of the differential limiting force when the inner wheel speed $N_{in}$ is lower than the outer wheel speed $N_{out}$ will be described below with reference to FIG. 4. When the inner wheel speed $N_{in}$ is lower than the outer wheel speed $N_{out}$, torque shifts from the outer wheel to the inner wheel. Therefore, the inner wheel creates a greater driving force than the outer wheel, so that reverse turning momentum that acts in a direction of hampering the turning occurs in the vehicle.

If the vehicle's steering characteristic shifts from neutral steer shown in the center of FIG. 4 to understeer shown on the left side of FIG. 4, the final control amount T is compensated to decrease by the yaw rate correspondence control amount $T_y$. According to the decrease of the final control amount T, the actual differential limiting force between the right and left front wheels 4 is also reduced. As a result, the torque shift amount from the outer wheel to the inner wheel is reduced. The driving force of the inner wheel is also decreased, whereas that of the outer wheel is increased. This lessens the reverse turning momentum of the vehicle and prevents understeer. In other words, it is impossible to change the direction of the torque shift from the outer wheel to the inner wheel due to the magnitude relation between the inner and outer wheel speeds $N_{in}$ and $N_{out}$, so that the reverse turning momentum still occurs in the vehicle. However, the reverse turning momentum is reduced to the greatest extent possible by controlling the differential limiting force, to thereby prevent understeer.

If the vehicle's steering characteristic shifts from neutral steer to oversteer shown on the right side of FIG. 4, the final control amount T is compensated to increase by the yaw rate correspondence control amount $T_y$. This increases the actual differential limiting force between the right and left front wheels 4 according to the increase of the final control amount T. Consequently, the torque shift amount from the outer wheel to the inner wheel is increased. The driving force of the inner wheel is also increased, whereas that of the outer wheel is decreased. Therefore, the reverse turning momentum of the vehicle is enhanced, which prevents oversteer.

As described above, in the differential limiting control device for a vehicle according to the present embodiment, the differential limiting force between the right and left front wheels 4 is integrally controlled during vehicle turning in reflection of not only the magnitude relation between the inner and outer wheel speeds $N_{in}$ and $N_{out}$ but also the steering characteristic of the vehicle. The magnitude relation between the inner and outer wheel speeds $N_{in}$ and $N_{out}$ indicates the direction of the torque shift between the right and left front wheels 4, and accordingly, momentum (turning momentum or reverse turning momentum) that occurs in the vehicle at the moment. The steering characteristic of the vehicle indicates to which direction the vehicle momentum should be corrected. This makes it possible to set an optimum differential limiting force between the right and left front wheels 4 in respect of the vehicle's driving state according to a combination of conditions of the magnitude relation of the wheel speeds and the steering characteristic of the vehicle. As a result, the differential limiting force between the right and left front wheels 4 can be properly controlled, which makes it possible to prevent understeer and oversteer without fail. Consequently, a good steering characteristic can be actualized all the time regardless of the driving state of the vehicle.

As described above, the actual yaw rate Y and the target yaw rate $Y_{tgt}$ are applied in the calculating process of the yaw rate correspondence control amount $T_y$ in the control amount calculating section 34 and in the judging process of the vehicle's steering characteristic in the steering characteristic judging section 37. The actual yaw rate Y and the target yaw rate $Y_{tgt}$ can be considered as indexes that clearly indicate the turning state of the vehicle. Therefore, based upon the actual yaw rate Y and the target yaw rate $Y_{tgt}$, the calculation of the yaw rate correspondence control amount $T_y$ and the judgment of the steering characteristic can be precisely carried out. Accordingly, it is possible to further properly control the differential limiting force between the right and left front wheels 4.

As control amounts with respect to the differential limiting force between the right and left front wheels 4, not only the yaw rate correspondence control amount $T_y$ but also a revolution difference correspondence control amount, an acceleration correspondence control amount, and a deceleration correspondence control amount are calculated as the base control amount $T_{base}$. The final control amount T is obtained by compensating to increase or decrease the base control amount $T_{base}$ by the yaw rate correspondence control amount $T_y$. In other words, there exists the base control amount $T_{base}$ for producing the differential limiting force, and the compensation based upon the yaw rate correspondence control amount $T_y$ is applied to the base control amount $T_{base}$. For this reason, it is possible to make not only the increase compensation but the decrease compensation anytime. Consequently, it is possible to achieve an appropriate steering characteristic while surely reflecting the yaw rate correspondence control amount $T_y$ on the differential limiting force between the right and left front wheels 4.

Although descriptions of the embodiment will be finished here, the aspect of the present invention is not limited to the above-mentioned embodiment. For instance, the embodiment is applied to the vehicle having an electronic control on-demand type four-wheel drive mechanism based on an FF layout vehicle, to thereby control the differential limiting force between the right and left front wheels 4. However, the aspect of the present invention is not limited to the foregoing. For instance, the differential limiting force between the right and left front wheels in an FF layout vehicle may be controlled. In the four-wheel drive vehicle whose base is an FR layout vehicle, the differential limiting force between the right and left front wheels may be controlled. It is also possible, in a four-wheel drive vehicle whose base is an FF layout or FR layout vehicle, to control a differential limiting force between right and left rear wheels.

According to the embodiment, yaw rate is applied as the target turning state index. However, the target turning state index is not limited to this as long as it is an index that correlates with the turning state of the vehicle. For example, lateral acceleration may be applied instead of yaw rate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A differential limiting control device for a vehicle, comprising:
   a differential limiting unit that regulates a differential limiting force between right and left wheels to which a driving force from a driving source is transmitted;
   a target turning state index determination unit that determines target yaw rate as a target turning state index on the basis of a driving state of a vehicle;
   an actual turning state index detection unit that detects an actual yaw rate as actual turning state index of the vehicle;
   a control amount calculating unit that calculates a turning correspondence control amount as a compensation amount with respect to the differential limiting force to be applied to between the right and left wheels, based upon yaw rate deviation between the target yaw rate and the actual yaw rate;
   a steering characteristic judging unit that judges whether a vehicle's steering characteristic of the moment is understeer or oversteer based upon a comparison result between the target yaw rate and the actual yaw rate;
   a wheel speed detection unit that detects wheel speeds of the right and left wheels;
   a wheel speed judging unit that judges whether wheel speed of a turning inner wheel is higher than wheel speed of a turning outer wheel, or wheel speed of the turning inner wheel is lower than wheel speed of the turning outer wheel; and
   a differential limiting control unit that reflects the turning correspondence control amount in the differential limiting force for compensation toward an increase or decrease side according to a combination of the steering characteristic judged by the steering characteristic judging unit and a result of judgment by the wheel speed judging unit, and controlling the differential limiting unit according to a differential limiting force after the compensation,
   wherein if it is determined that wheel speed of a turning inner wheel is higher than wheel speed of a turning outer wheel, the differential limiting control unit applies an increase compensation to the differential limiting force between the right and left wheels according to the turning correspondence control amount when the steering characteristic judged by the steering characteristic judging unit is understeer, and applies a decrease compensation to the differential limiting force between the right and left wheels according to the turning correspondence control amount when the steering characteristic is oversteer, and wherein, if it is determined that the wheel speed of the turning inner wheel is lower than the wheel speed of the turning outer wheel, the differential limiting control unit applies a decrease compensation to the differential limiting force between the right and left wheels according to the turning correspondence control amount when the steering characteristic judged by the steering characteristic judging unit is understeer, and applies an increase compensation to the differential limiting force between the right and left wheels according to the turning correspondence control amount when the steering characteristic is oversteer.

2. The differential limiting control device for a vehicle according to claim 1, wherein:

the differential limiting control unit has a base control amount calculating unit that calculates as a base control amount of the differential limiting force at least one of a revolution difference correspondence control amount based upon difference between the wheel speeds of the right and left wheels, an acceleration correspondence control amount based upon a vehicle acceleration state caused by an accelerating operation, and a deceleration correspondence control amount based upon a vehicle deceleration state caused by a decelerating operation; and the differential limiting control unit applies an increase or decrease compensation to the base control amount calculated by the base control amount calculating unit according to the turning correspondence control amount.

3. The differential limiting control device for a vehicle according to claim 1, wherein:

the right and left wheels are front wheels of the vehicle.

4. The differential limiting control device for a vehicle according to claim 1, wherein:

the vehicle is a four-wheel drive vehicle in which an electronic control coupling that distributes a driving force to the front and rear wheels of the vehicle is installed in between a front differential and a rear differential; and the differential limiting unit is provided only to the front differential.

* * * * *